(12) United States Patent
Nguyen et al.

(10) Patent No.: US 11,765,785 B2
(45) Date of Patent: Sep. 19, 2023

(54) DISCONTINUOUS RECEPTION NOTIFICATIONS IN A WIRELESS COMMUNICATION SYSTEM

(71) Applicant: QUALCOMM Incorporated, San Diego, CA (US)

(72) Inventors: Tien Viet Nguyen, Bridgewater, NJ (US); Kapil Gulati, Belle Mead, NJ (US); Junyi Li, Chester, NJ (US); Hong Cheng, Basking Ridge, NJ (US); Zhibin Wu, Los Altos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/011,966

(22) Filed: Sep. 3, 2020

(65) Prior Publication Data

US 2021/0076451 A1     Mar. 11, 2021

Related U.S. Application Data

(60) Provisional application No. 62/896,209, filed on Sep. 5, 2019.

(51) Int. Cl.
*H04W 76/11* (2018.01)
*H04W 76/28* (2018.01)
(Continued)

(52) U.S. Cl.
CPC .......... *H04W 76/28* (2018.02); *H04B 17/318* (2015.01); *H04W 4/70* (2018.02);
(Continued)

(58) Field of Classification Search
CPC ............ H04W 76/28; H04W 28/0268; H04W 64/003; H04W 72/0406; H04W 76/11;
(Continued)

(56) References Cited

U.S. PATENT DOCUMENTS

2018/0084497 A1\* 3/2018 Jung ................. H04W 72/0406
2018/0206252 A1\* 7/2018 Thangarasa ........... H04W 72/54
(Continued)

FOREIGN PATENT DOCUMENTS

EP          3499975 A1 \*  6/2019  ............ H04W 52/02
EP          3499975 A1     6/2019
WO     2018022854 A2     2/2018

OTHER PUBLICATIONS

International Search Report and Written Opinion—PCT/US2020/049495—ISA/EPO—dated Dec. 17, 2020.

*Primary Examiner* — Lakeram Jangbahadur
(74) *Attorney, Agent, or Firm* — Procopio, Cory, Hargreaves & Savitch LLP

(57) ABSTRACT

Aspects described herein relate to sidelink-assisted virtual multi-link. In one aspect, for example, a relay node may serve as an additional virtual antenna panel for a UE by receiving downlink data from a base station via an access link, or receiving uplink data from the UE via a sidelink. The relay node may forward the downlink data to the UE via sidelink, or the uplink data to the base station via the access link. In another aspect, a base station may determine, for a UE, quasi-colocation (QCL) information and a grant for one or both of one or more access link resources or one or more sidelink resources. The base station may further transmit, to the UE, the QCL information and the grant on a downlink communication channel.

22 Claims, 8 Drawing Sheets

(51) Int. Cl.
  *H04W 28/02*   (2009.01)
  *H04W 64/00*   (2009.01)
  *H04B 17/318*  (2015.01)
  *H04W 80/02*   (2009.01)
  *H04W 4/70*    (2018.01)
  *H04W 72/20*   (2023.01)
  *H04W 92/18*   (2009.01)

(52) U.S. Cl.
  CPC ..... *H04W 28/0268* (2013.01); *H04W 64/003* (2013.01); *H04W 72/20* (2023.01); *H04W 76/11* (2018.02); *H04W 80/02* (2013.01); *H04W 92/18* (2013.01)

(58) Field of Classification Search
  CPC ....... H04W 80/02; H04W 4/70; H04W 92/18; H04W 88/04; H04W 76/14; H04W 4/08; H04W 4/023; H04W 88/02; H04B 17/318; H04B 17/327
  See application file for complete search history.

(56) References Cited

U.S. PATENT DOCUMENTS

| | | | |
|---|---|---|---|
| 2019/0230569 A1* | 7/2019 | Kim | H04W 88/16 |
| 2021/0014893 A1* | 1/2021 | Park | H04L 5/0057 |
| 2021/0037468 A1* | 2/2021 | Huang | H04W 76/14 |
| 2021/0045093 A1* | 2/2021 | Rao | H04W 72/14 |
| 2021/0120372 A1* | 4/2021 | Kalhan | H04W 28/02 |
| 2021/0297842 A1* | 9/2021 | Shrivastava | H04W 28/24 |

* cited by examiner

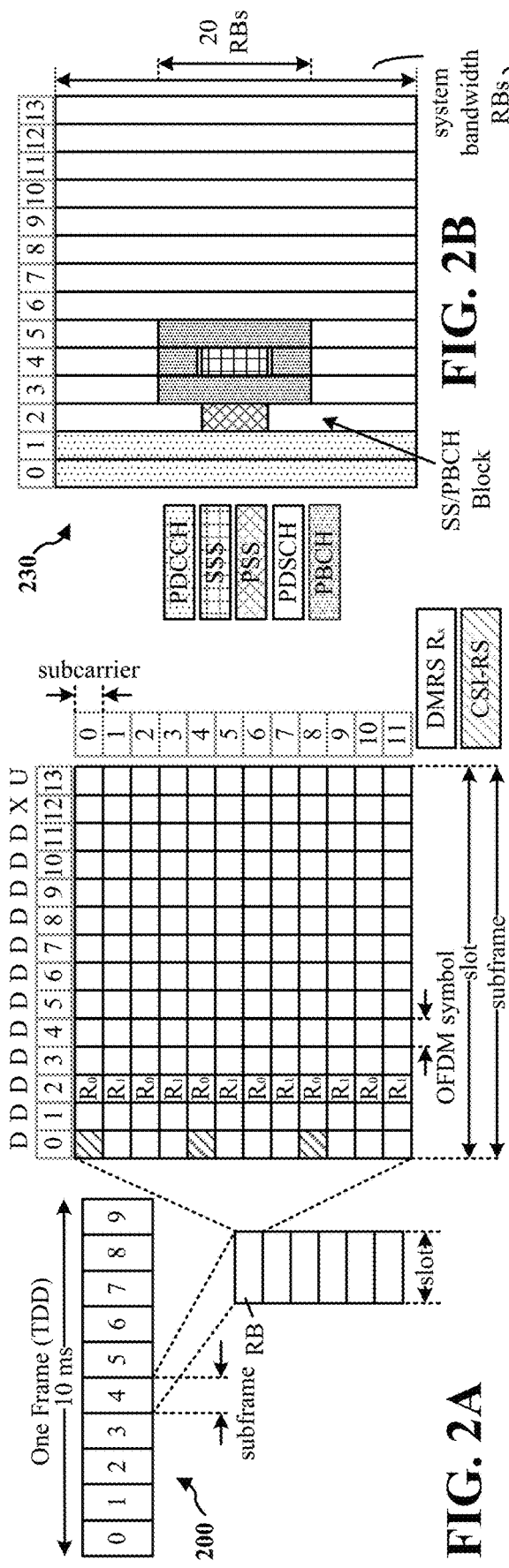
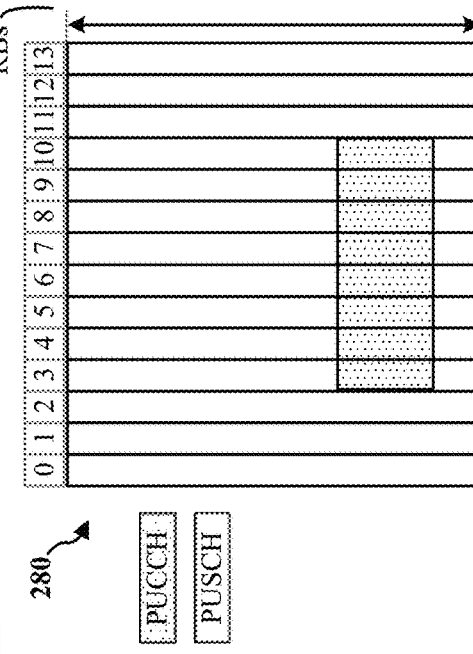
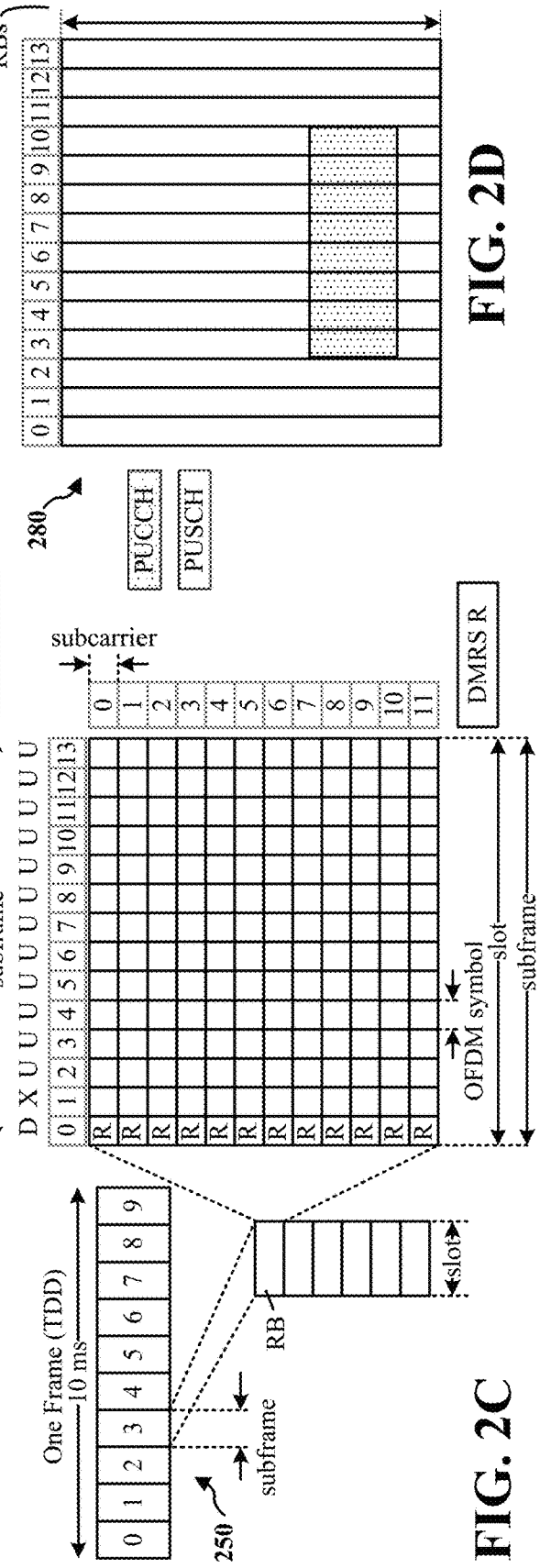
FIG. 2A
FIG. 2B
FIG. 2C
FIG. 2D

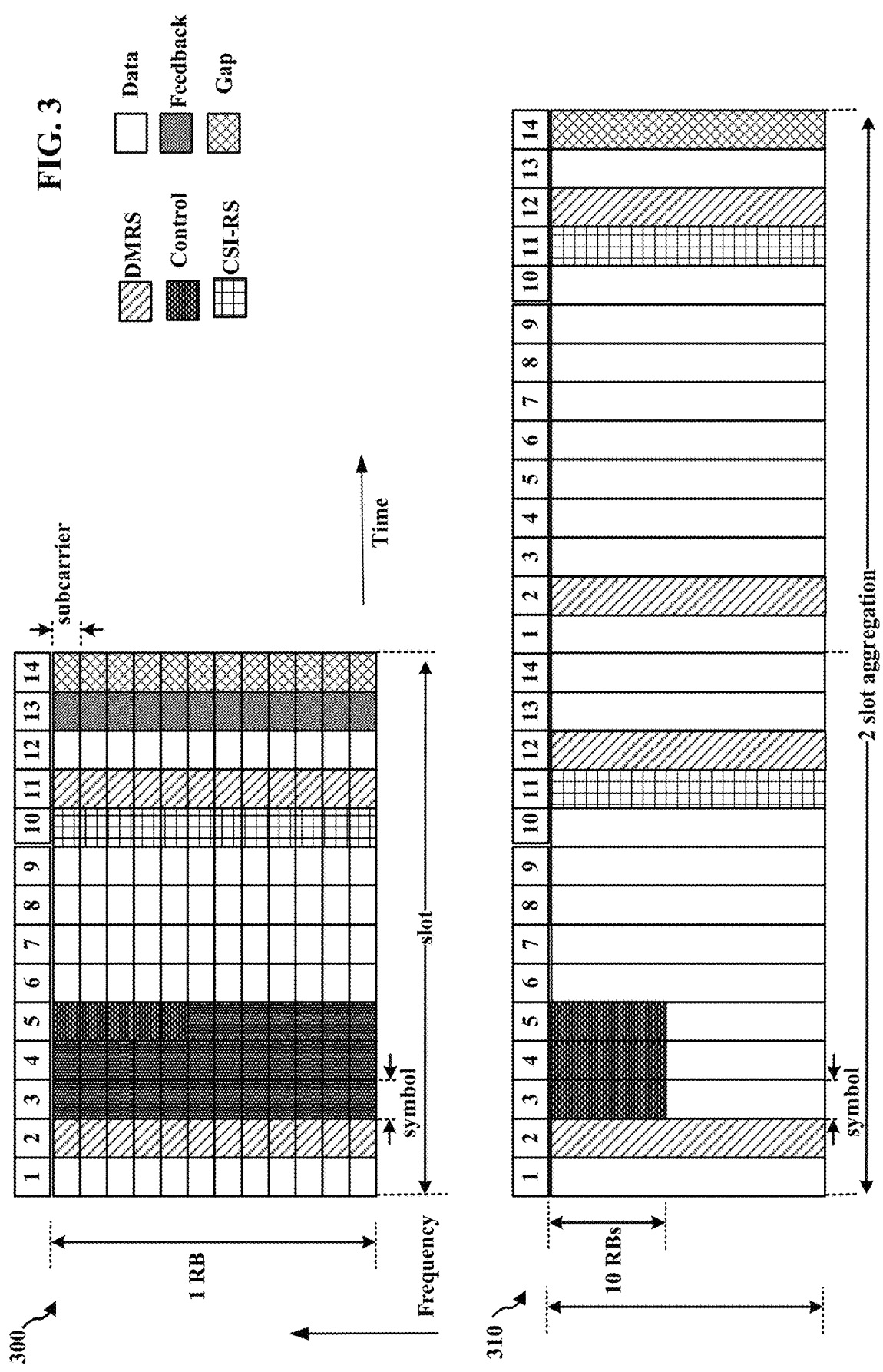

DISCONTINUOUS RECEPTION NOTIFICATIONS IN A WIRELESS COMMUNICATION SYSTEM

CROSS-REFERENCE TO RELATED APPLICATION(S)

This application claims the benefit of U.S. Provisional application Ser. No. 62/896,209, entitled "DISCONTINUOUS RECEPTION NOTIFICATIONS IN A WIRELESS COMMUNICATION SYSTEM" and filed on Sep. 5, 2019, which is expressly incorporated by reference herein in its entirety.

BACKGROUND

The present disclosure relates generally to communication systems, and more particularly, to discontinuous reception (DRX) notifications in wireless communication systems.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Some wireless communication networks include device-to-device (D2D) communication such as, but not limited to, vehicle-based communication devices that can communicate from vehicle-to-vehicle (V2V), vehicle-to-infrastructure (V2I) (e.g., from the vehicle-based communication device to road infrastructure nodes), vehicle-to-network (V2N) (e.g., from the vehicle-based communication device to one or more network nodes, such as a base station), a combination thereof and/or with other devices, which can be collectively referred to as vehicle-to-anything (V2X) communications. Further improvements in DRX technologies are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communications by a user equipment (UE) is provided. The method may include determining discontinuous reception (DRX) information associated with a DRX mode including at least one of timing or location information. The method may further include transmitting a DRX notification including the DRX information to a second UE.

In a further aspect, the present disclosure includes an apparatus for wireless communication including a memory and at least one processor coupled to the memory. The at least one processor may be configured to determine DRX information associated with a DRX mode including at least one of timing or location information. The at least one processor may be configured to transmit a DRX notification including the DRX information to a second UE.

In an additional aspect, the present disclosure includes an apparatus for wireless communication including means for determining DRX information associated with a DRX mode including at least one of timing or location information. The apparatus may further include means for transmitting a DRX notification including the DRX information to a second UE.

In yet another aspect, the present disclosure includes a non-transitory computer-readable medium storing computer executable code, the code when executed by a processor cause the processor to determine DRX information associated with a DRX mode including at least one of timing or location information. The code when executed by a processor cause the processor to transmit a DRX notification including the DRX information to a second UE.

According to another example, a method of wireless communications by a UE is provided. The method may include receiving, from a second UE, a DRX notification including DRX information of a DRX mode associated with the second UE. The method may further include adjusting communication with the second UE based on the DRX information of the DRX mode associated with the second UE.

In a further aspect, the present disclosure includes an apparatus for wireless communication including a memory and at least one processor coupled to the memory. The at least one processor may be configured to receive, from a second UE, a DRX notification including DRX information of a DRX mode associated with the second UE. The at least one processor may be configured to adjust communication with the second UE based on the DRX information of the DRX mode associated with the second UE.

In an additional aspect, the present disclosure includes an apparatus for wireless communication including means for receiving, from a second UE, a DRX notification including DRX information of a DRX mode associated with the second UE. The apparatus may further include means for adjusting communication with the second UE based on the DRX information of the DRX mode associated with the second UE.

In yet another aspect, the present disclosure includes a non-transitory computer-readable medium storing computer executable code, the code when executed by a processor cause the processor to receive, from a second UE, a DRX notification including DRX information of a DRX mode associated with the second UE. The code when executed by a processor cause the processor to adjust communication with the second UE based on the DRX information of the DRX mode associated with the second UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams of examples of a first 5G/NR frame, DL channels within a 5G/NR subframe, a second 5G/NR frame, and UL channels within a 5G/NR subframe, respectively, for use in communications between two of the communicating nodes in the system of FIG. 1.

FIG. 3 is a diagram of an example frame structure and resources for sidelink communications between two of the communicating nodes in the system of FIG. 1.

DETAILED DESCRIPTION

Figure 1:
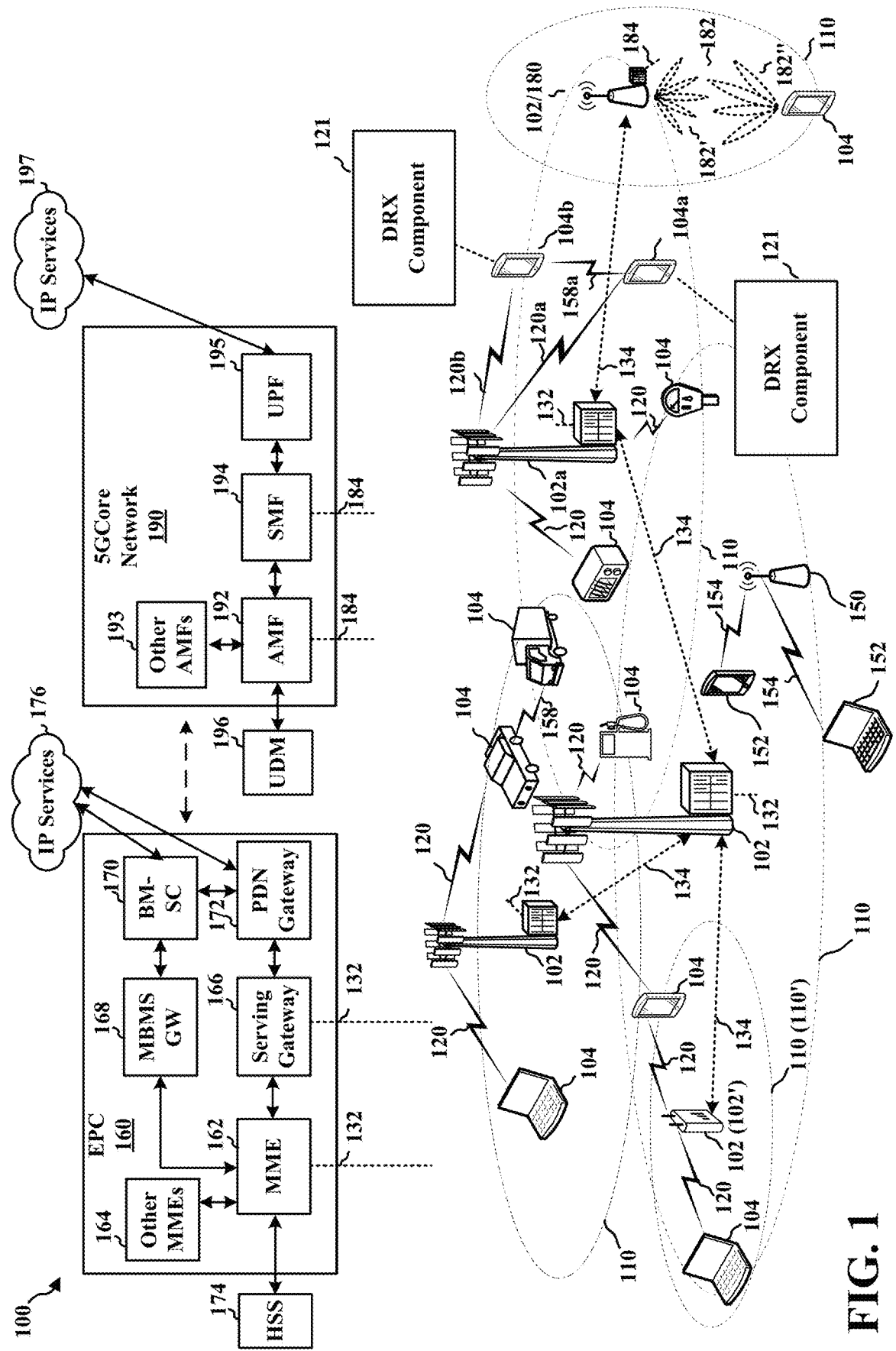
FIG. 1 is a schematic diagram of an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present aspects generally relate to discontinuous reception (DRX) in a wireless communication system, and more specifically, in a device-to-device (D2D) communication system. D2D connectivity may be supported in some wireless communication systems (e.g., Long Term Evolution (LTE) and/or New Radio (NR)). In some aspects, application of D2D may include vehicle-to-everything (V2X), sensor networks, public-safety-related communication services with limited infrastructure availability. D2D may include a relay user equipment (UE) relaying communications from a base station over a sidelink to a UE, or from UE to the base station via the relay UE.

DRX allows a UE to enter a periodic sleep mode to reduce power consumption, thereby conserving the battery of the mobile device, and for thermal dissipation purposes. DRX also may be beneficial in various communication scenarios such as device coexistence and/or synchronization search. Nonetheless, in any scenario, a UE communicating with a base station and/or another UE may operate in a DRX mode by periodically powering down hardware and/or software radio components. While in the DRX mode, the UE may monitor the physical downlink control channel (PDCCH) and/or physical shared control channel (PSCCH) at regular intervals during wake cycle.

However, DRX may reduce a packet reception ratio (PRR) (e.g., similar to half duplex, which may limit bidirectional communication within the same timeslot, or simultaneous bidirectional communication). In such case, the limitation may be overcome by blind retransmissions, which are retransmissions not performed based on a request, but on a scheduled/unscheduled pattern, or blindly to one or more receivers. Nonetheless, blind retransmissions may not be efficient as the retransmitted packet(s) were most likely initially received at the receiver. Further, for DRX, the UE may not have woken up from the DRX mode at the time of retransmission.

Specifically, present disclosure relates to enhancements to DRX, and in particular, to communications during a DRX mode. The present disclosure provides apparatus and methods in which a receiver UE may determine DRX information associated with a DRX mode including at least one of timing or location information. The UE may further transmit a DRX notification including the DRX information to a second UE. In another implementation, the present disclosure provides apparatus and methods in which a transmitter UE receives, from a second UE, a DRX notification including DRX information of a DRX mode associated with the second UE. The UE may further adjust communication with the second UE based on the DRX information of the DRX mode associated with the second UE.

These and other features of the present disclosure are discussed in detail below with regard to FIGS. 1-8.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)).

In certain aspects, a relay UE 104b may include a DRX component 121 for configuring communication during or for a DRX mode with a sidelink-assisted UE 104a, which may also include the DRX component 121. The sidelink-assisted UE 104a may have a first access link 120a directly with the base station 102a, and a second communication link with the base station 102a via a sidelink 158a with the relay UE 104b, which has a second access link 120b to the base station 102a. Further details of the DRX mode and operations performed by the relay UE 104b, the sidelink-assisted UE 104a are discussed in more detail below.

The base stations 102, including base station 102a, may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5G core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104, including relay UE 104b and sidelink-assisted multi-link UE 104a. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120, including access links 120a and 120b, between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104, such as relay UE 104b and sidelink-assisted UE 104a, may communicate with each other using device-to-device (D2D) communication link 158, one example of which includes sidelink 158a. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIGS. 2A-2D include diagrams of example frame structures and resources that may be utilized in communications between the base stations 102, the UEs 104 described in this disclosure. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

FIG. 3 illustrates example diagrams 300 and 310 illustrating examples slot structures that may be used for wireless communication between UE 104a and UE 104b, e.g., for sidelink communication. The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 300 illustrates a single slot transmission, e.g., which may correspond to a 0.5 ms transmission time interval (TTI). Diagram 310 illustrates an example two-slot aggregation, e.g., an aggregation of two 0.5 ms TTIs. Diagram 300 illustrates a single RB, whereas diagram 210 illustrates N RBs. In diagram 310, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 3, some of the REs may comprise control information, e.g., along with demodulation RS (DMRS). FIG. 3 also illustrates that symbol(s) may comprise CSI-RS. The symbols in FIG. 3 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on DCI triggering). For time/frequency tracking, CSI-RS may be either periodic or aperiodic. CSI-RS may be transmitted in busts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 3. Multiple slots may be aggregated together. FIG. 3 also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 4:
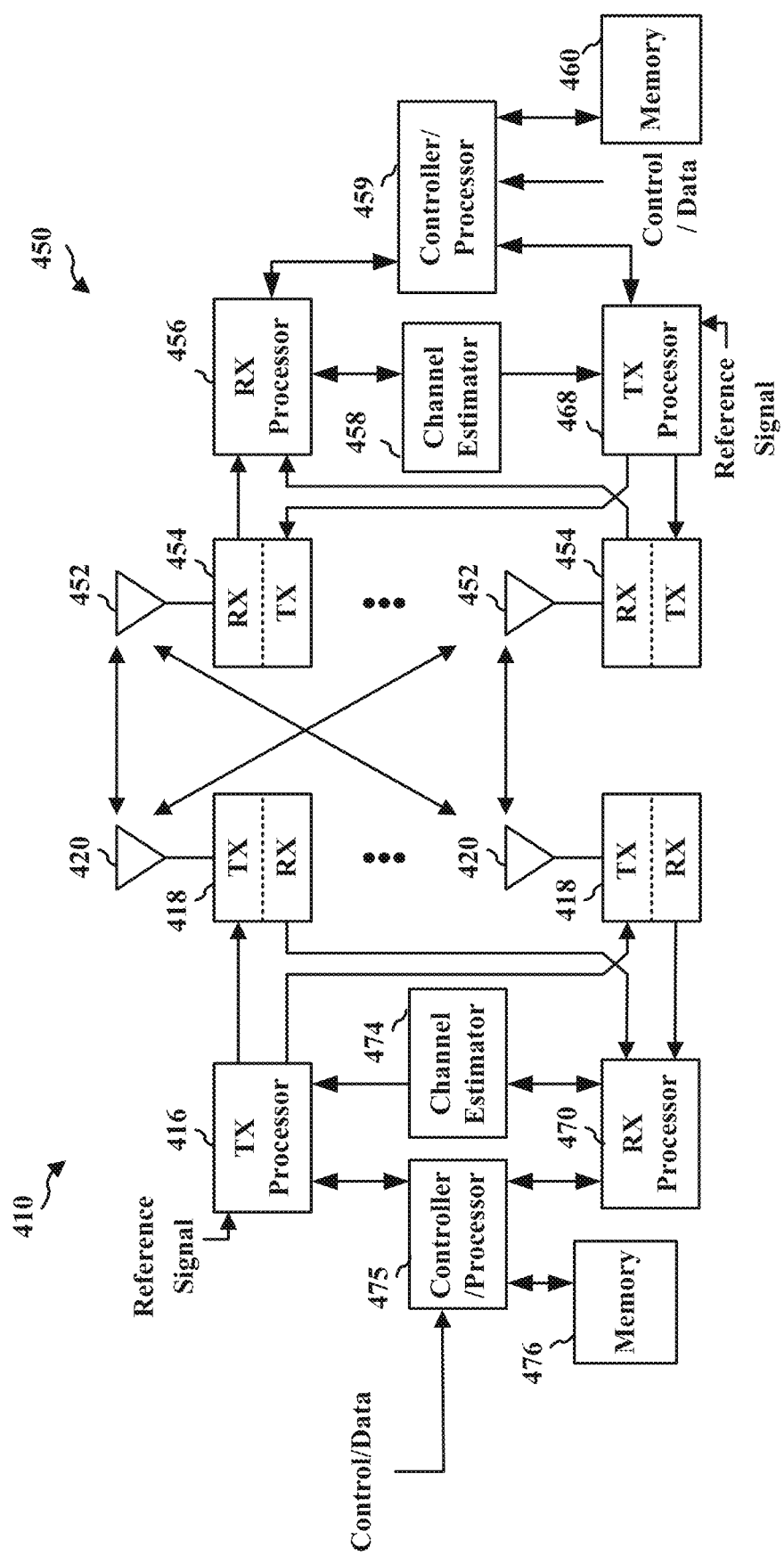
FIG. 4 is a schematic diagram of an example of hardware components of two of the communicating nodes in the system of FIG. 1.

FIG. 4 is a diagram of hardware components of an example transmitting and/or receiving (tx/rx) nodes 410 and 450, which may be any combinations of base station 102—UE 104 communications, and/or UE 104—UE 104 communications in system 100. For example, such communications may including, but are not limited to, communications such as a base station transmitting to a relay UE, a relay UE transmitting to a sidelink-assisted UE, a sidelink-assisted UE transmitting to a relay UE, or a relay UE transmitting to a base station in an access network. In one specific example, the tx/rx node 410 may be an example implementation of base station 102 and where tx/rx node 450 may be an example implementation of UE 104. In the DL, IP packets from the EPC 160 may be provided to a controller/processor 475. The controller/processor 475 implements layer 4 and layer 2 functionality. Layer 4 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the tx/rx node 450. Each spatial stream may then be provided to a different antenna 420 via a separate transmitter 418TX. Each transmitter 418TX may modulate an RF carrier with a respective spatial stream for transmission.

At the tx/rx node 450, each receiver 454RX receives a signal through its respective antenna 452. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the tx/rx node 450. If multiple spatial streams are destined for the tx/rx node 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the tx/rx node 410. These soft decisions may be based on channel estimates computed by the channel estimator 458. The soft decisions are then decoded and deinterleaved to recover the data and control signals that were originally transmitted by the tx/rx node 410 on the physical channel. The data and control signals are then provided to the controller/processor 459, which implements layer 4 and layer 2 functionality.

The controller/processor 459 can be associated with a memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the DL transmission by the tx/rx node 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the tx/rx node 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The UL transmission is processed at the tx/rx node 410 in a manner similar to that described in connection with the receiver function at the tx/rx node 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover IP packets from the tx/rx node 450. IP packets from the controller/processor 475 may be provided to the EPC 160. The controller/processor 475 is also responsible for error detection using an ACK and/or NACK protocol to support HARQ operations.

In an implementation, at least one of the TX processor 468, the RX processor 456, and the controller/processor 459 may be configured to perform aspects in connection with DRX component 121 of FIG. 1.

In an implementation, at least one of the TX processor 416, the RX processor 470, and the controller/processor 475 may be configured to perform aspects in connection with DRX component 121 of FIG. 1.

Figure 5:
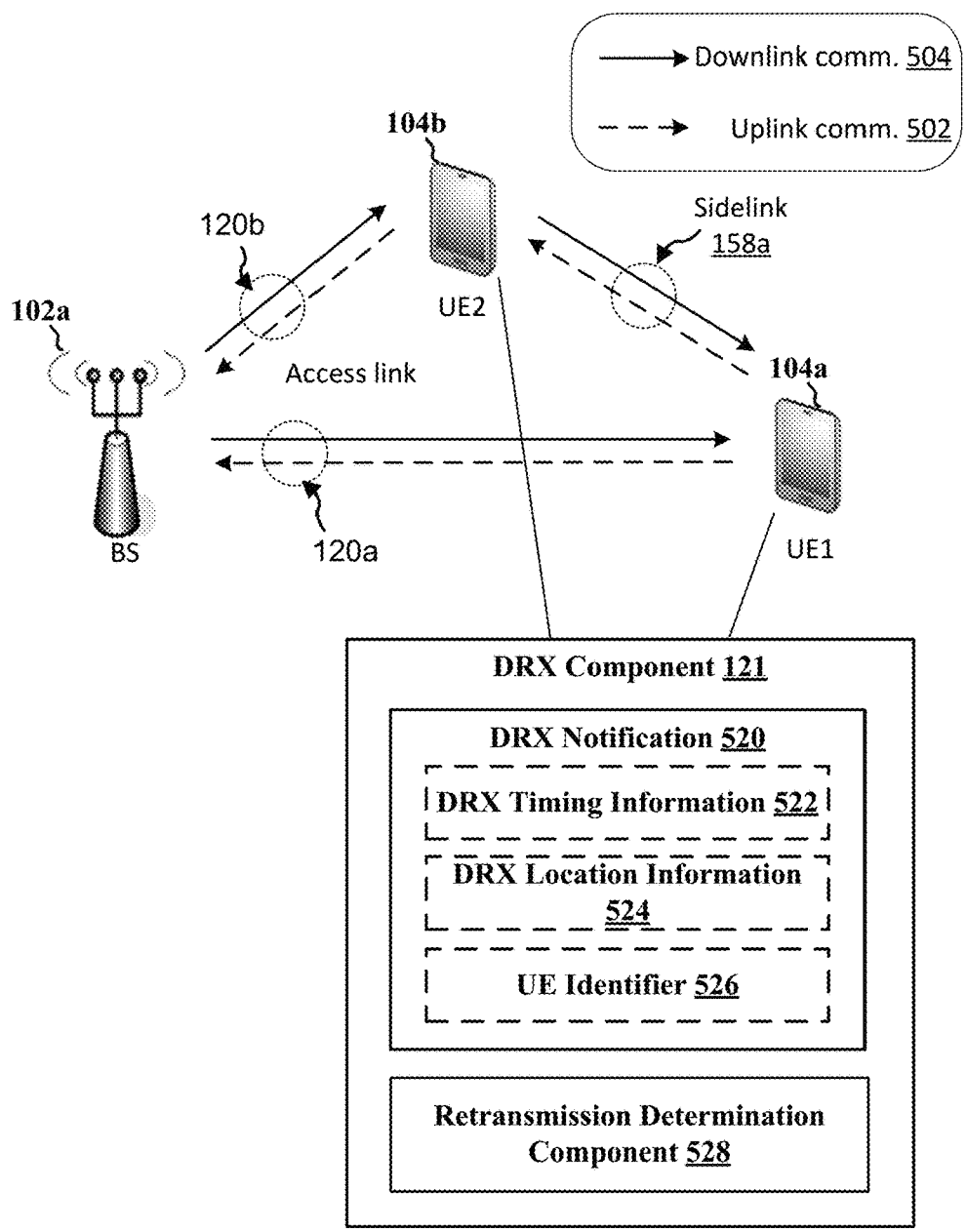
FIG. 5 is a schematic diagram of an example of a device-to-device (D2D) communication configuration operable in the system of FIG. 1.

Referring to FIG. 5 aspects may relate to a D2D/V2X communication scenario 500 that includes D2D/V2X communications over a sidelink. As mentioned above, sidelink communication generally includes any type of device-to-device (D2D) communication. D2D communications may be used in applications such as, but not limited to, vehicle-to-anything (V2X) or vehicle to any other device type of communications, sensor networks, public safety-related communication services with limited infrastructure availability, or any other such type of application.

In the sidelink D2D/V2X communication scenario 500, a sidelink-assisted multi-link UE 104a may establish a communication with one or more base stations 102a over one or more communication links, which include at least one direct link and at least one indirect link via a sidelink with a relay UE 104b. In a first case, the sidelink-assisted UE 104a directly communicates with the base station 102a via a first access link (AL) 120a, and indirectly communicates with the base station 102a via a sidelink 158a with the relay UE 104b, which has a second access link 120b with the base station 102a.

In general, an access link such as access link 120a or 120b is a communication link between a respective UE and a respective base station (or gNB), which may also be referred to as a Uu interface in 4G LTE and/or in 5G NR technologies. In general, the sidelink 158a is a communication link between UEs, which may be referred to as a ProSe 5 (PC5) interface in 4G LTE and/or in 5G NR technologies. In any case, the sidelink D2D/V2X communication scenario 500 may be utilized for improved diversity, e.g., sending the same data over two links (access link and sidelink), and/or improved throughput, e.g., sending different, independent data over each link.

Additionally, in the sidelink D2D/V2X communication scenario 500, the communications exchanged between the base station 102a/102b, relay UE 104b, and sidelink-assisted UE 104a may be uplink (UL) communications 502 and/or downlink (DL) communications 504.

In an example, one or both of a sidelink-assisted UE and the relay UE may further include a direct access link to the base station. Specifically, the access link may be a communication link between a UE and a base station (e.g., gNB), also referred to as a Uu interface (DL/UL) in LTE or NR. Further, a sidelink may be a communication link between UEs, also referred to as a PC5 interface in LTE or NR.

In an implementation, both of the UEs 104a and 104b may include the DRX component 121. In a DRX communication configuration scenario, one of UEs 104a or 104b may be a transmitter UE and the other may be a receiver UE. The receiver UE may send a DRX notification 520, which may correspond to an indication or message that includes one or more of DRX timing information (e.g., DRX start and stop time), DRX location information 524, or a UE identifier 526. The DRX notification 520 may be transmitted as a MAC control element (CE).

The transmitter UE, upon receiving the DRX notification 520, and via a retransmission determination component 528, may infer or otherwise determine that the receiver UE (also referred to as the DRX UE) may not be able to receive data during the DRX period specified by the DRX timing information 522. The transmitter UE may then be configured to retransmit the data packet when the receiver UE comes out of or wakes up from the DRX mode if at least one retransmission condition is met. For example, the retransmission condition may correspond to a distance value between the transmitter UE and the receiver (DRX) UE and/or a reference signal received power (RSRP) of the DRX notification 520.

Hence, the retransmission determination component 528 may determine to retransmit the data packet(s) that were not received by the receiver (DRX) UE while in the DRX mode if distance value between the transmitter UE and the receiver (DRX) UE satisfied (e.g., is equal to or smaller than) a distance threshold value and/or a reference signal received power (RSRP) of the DRX notification 520 satisfied (e.g., equal to or larger than) an RSRP threshold value (e.g., when DRX location information 524 is not available or received within the DRX notification 520). In some aspects, the distance and RSRP threshold values may be derived based on a 5G quality-of-service (5QI) identifier, which identify a specific QoS forwarding behavior for a 5G QoS flow (i.e., defines packet loss rate and packet delay budget).

In some aspects, the DRX notification 520 may be applied to both unicast/group cast and broadcast scenarios. For the unicast scenario, a UE may be in unicast connections with one or more other UEs. The receiver UE may broadcast the DRX notification 520 including at least the DRX timing information 522 and the UE identifier 526 to the one or more transmitter UEs. The one or more transmitter UEs that are connected with the UE that broadcasted the DRX notification 520 may avoid communicating with that UE during the DRX period. The UEs that do not have a connection with the broadcasting UE may discard or ignore the DRX notification 520. In some aspects, a receiver UE may send a DRX message via unicast to each of the UEs in the connection. In the broadcast scenario, the receiver UE may broadcast the DRX notification 520 including at least the DRX timing information 522 along with the UE identifier 526 to one or more transmitter UEs. The one or more transmitter UEs may broadcast during the DRX period defined by the DRX timing information 522 knowing that the receiver (DRX) UE cannot receive the broadcast. The one or more transmitter UEs may determine to retransmit the broadcast after the DRX period.

In a multicast scenario, a group of UEs including UEs 104a and 104b may be engaged in a multicast, where one UE is the only transmitter UE and the remaining UEs may be the receiver UEs. The transmitter UE may inform the group, via the DRX notification 520, of an upcoming DRX mode (e.g., power saving mode) for a DRX period 'T' so that the receiver UEs do not monitor the multicast during this time. The receiver UEs can also enter into a power saving mode as well, or engage in communications with others if desired.

In another multicast scenario, a group of UEs including UEs 104a and 104b may be engaged in a groupcast, where any UE can transmit to the remaining UEs. The UEs may agree on a common DRX cycle so that they can suspend the groupcast for some period of time (e.g., DRX period). The agreement may be reached based on a group leader determining a DRX period for all UEs, or one UE proposes the DRX period and the remaining UEs that are part of the group indicating whether they agree ('YES') or not ('NO').

Figure 6:
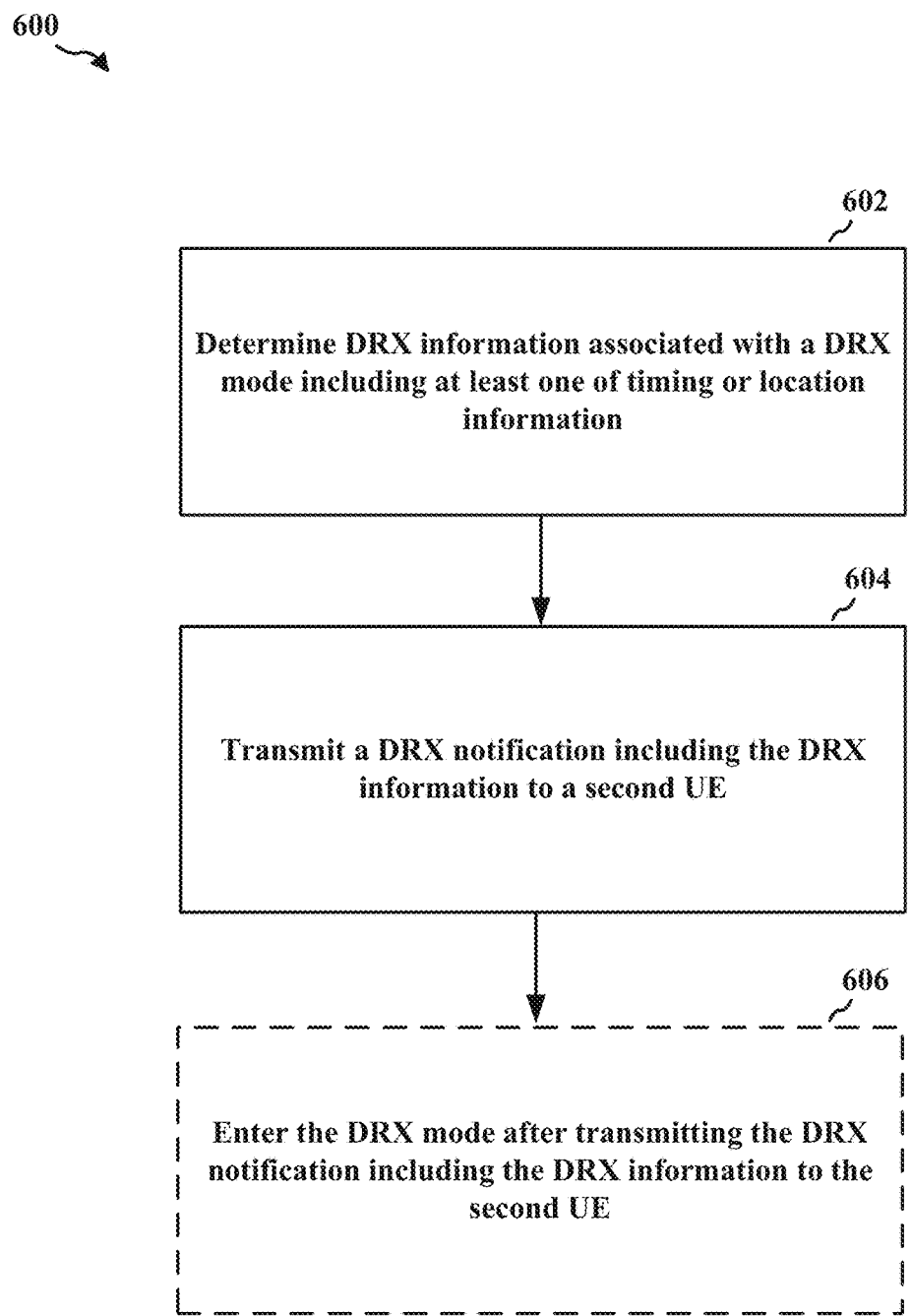
FIG. 6 is a flowchart of an example method of wireless communication of a relay UE operable in the system of FIG. 1.
Figure 8:
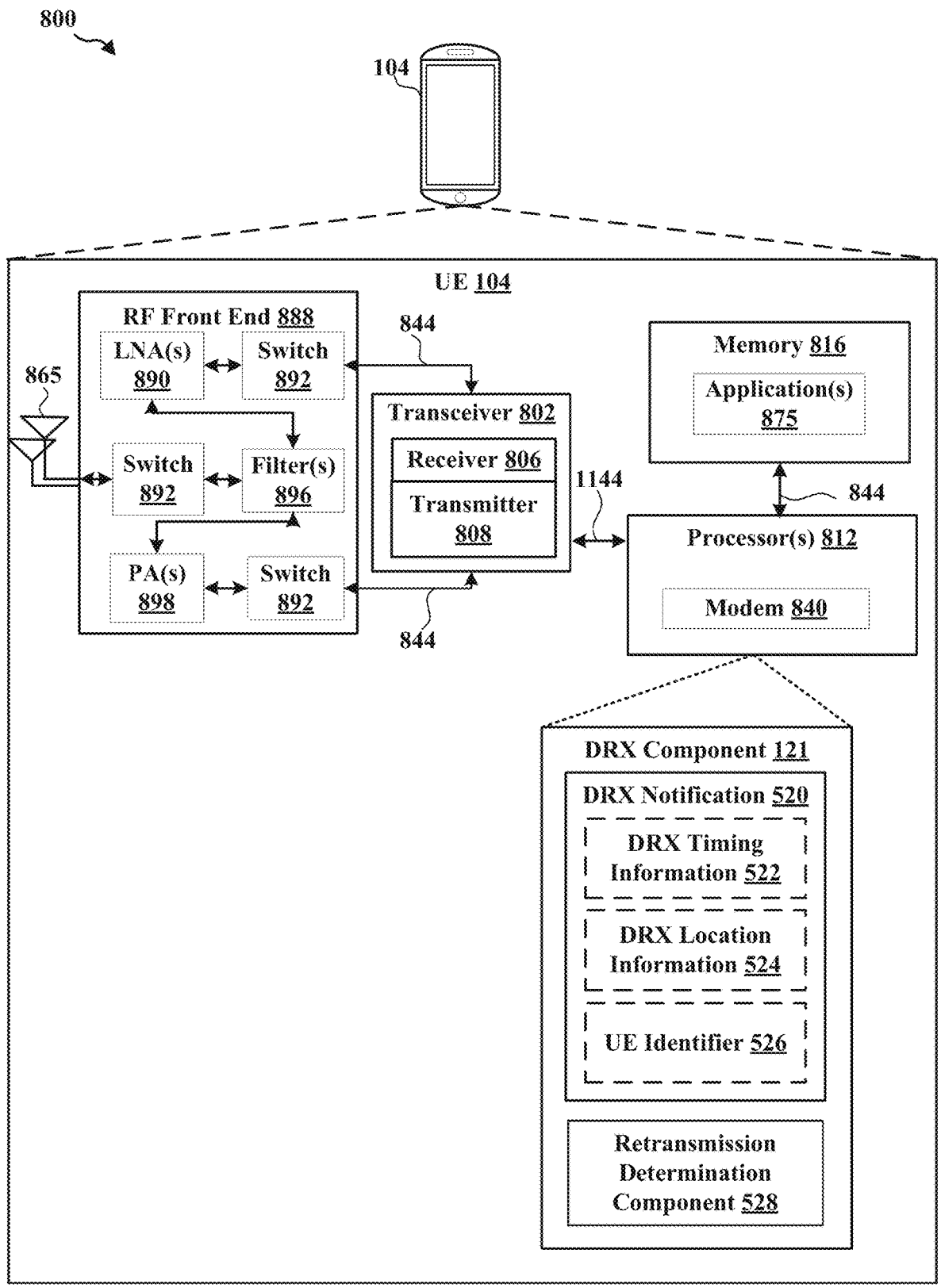
FIG. 8 is a block diagram of an example UE, in accordance with various aspects of the present disclosure.

Referring to FIG. 6, an example method 600 of wireless communication may be performed by one of the sidelink-assisted UE 104a or the relay UE 104b, which may include one or more components as discussed in FIG. 1, 5, or 8, and which may operate according to the DRX component 121 as discussed above with regard to FIG. 5.

At 602, method 600 includes determining DRX information associated with a DRX mode including at least one of timing or location information. For example, in an aspect, the sidelink-assisted UE 104a or the relay UE 104b may operate one or any combination of antennas 865, RF front end 888, transceiver 802, processor 812, memory 816, modem 840, or DRX component 121 to determine DRX information associated with a DRX mode including at least one of timing or location information. For example, any of the above components may include determining DRX information associated with a DRX mode including at least one of timing or location information.

At 604, method 600 includes transmitting a DRX notification including the DRX information to a second UE. For example, in an aspect, the relay UE 104b may operate one or any combination of antennas 865, RF front end 888, transceiver 802, processor 812, memory 816, modem 840, or DRX component 121 to transmit a DRX notification 520 including the DRX information to a second UE. For example, any of the above components may include transmitting a DRX notification including the DRX information to a second UE.

At 606, method 600 may optionally include entering the DRX mode after transmitting the DRX notification including the DRX information to the second UE. For example, in an aspect, the relay UE 104b may operate one or any combination of antennas 865, RF front end 888, transceiver 802, processor 812, memory 816, modem 840, or DRX component 121 to enter the DRX mode after transmitting the DRX notification including the DRX information to the second UE. For example, any of the above components may include entering the DRX mode after transmitting the DRX notification including the DRX information to the second UE.

In some implementations, the DRX information may further include a UE identifier 526.

In some implementations, the DRX notification 520 may be transmitted using at least one of a unicast transmission or a broadcast transmission.

In some implementations, the DRX information may include the timing information 522, where the timing information 522 may include a start time of a DRX period of the DRX mode and an end time of the DRX period of the DRX mode.

In some implementations, the location information 524 may include a location of the UE (e.g., global positioning system (GPS) information or relative position with respect to known reference points, i.e., roadside unit (RSU), other vehicles, etc.).

In some implementations, transmitting the DRX notification 520 may include transmitting a MAC CE including the DRX notification 520 to the second UE.

In some implementations, the UE may correspond to a receiver UE and the second UE corresponds to a transmitter UE in a D2D wireless communication system.

In some implementations, transmitting the DRX notification 520 may be transmitted on a sidelink channel (e.g., PSSCH/PSCCH), and the sidelink channel may be based on a PC5 interface.

Figure 7:
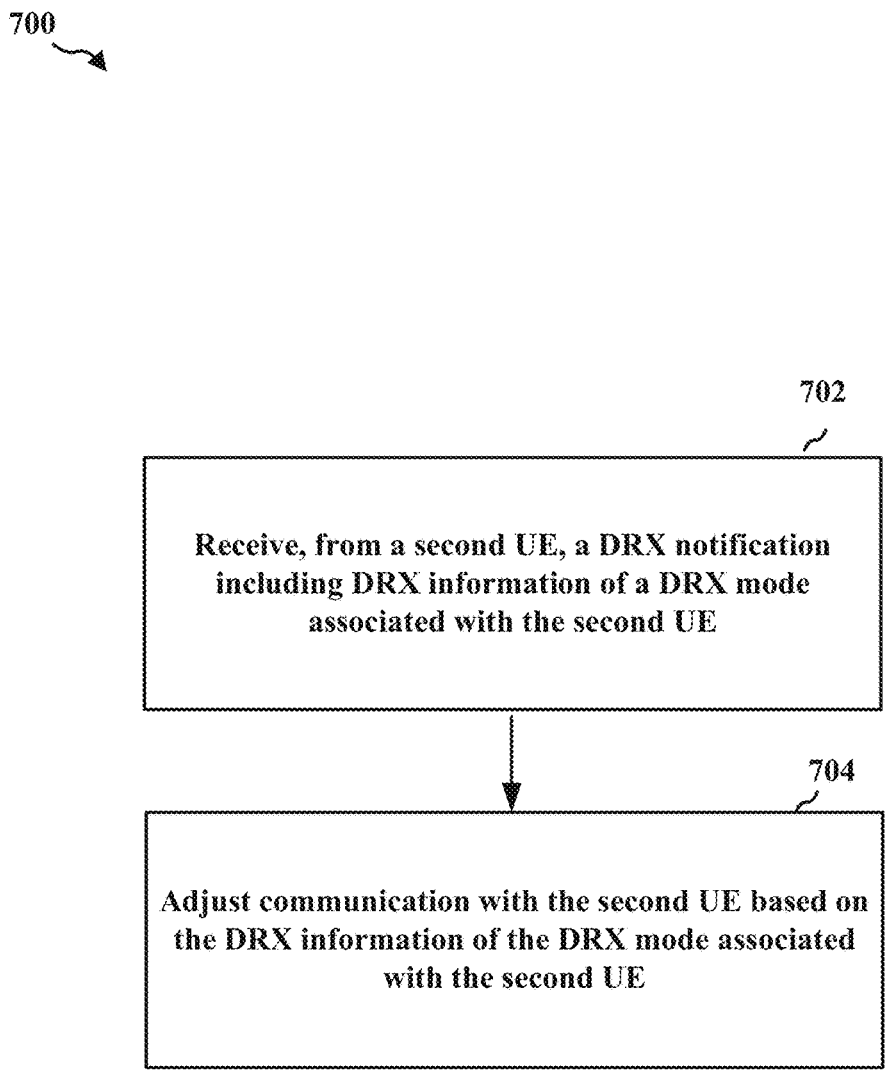
FIG. 7 is a flowchart of another example method of wireless communication of a base station operable in the system of FIG. 1.

Referring to FIG. 7, an example method 700 of wireless communication may be performed by one of the sidelink-assisted UE 104a or the relay UE 104b, which may include one or more components as discussed in FIG. 1, 5, or 8, and which may operate according to the DRX component 121 as discussed above with regard to FIG. 5.

At 702, method 700 includes receiving, from a second UE, a DRX notification including DRX information of a DRX mode associated with the second UE. For example, in an aspect, the sidelink-assisted UE 104a or the relay UE 104b may operate one or any combination of antennas 865, RF front end 888, transceiver 802, processor 812, memory 816, modem 840, or DRX component 121 to receive, from a second UE, a DRX notification 520 including DRX information of a DRX mode associated with the second UE. For example, any of the above components may include receiving, from a second UE, a DRX notification including DRX information of a DRX mode associated with the second UE.

At 704, method 700 includes adjusting communication with the second UE based on the DRX information of the DRX mode associated with the second UE. For example, in an aspect, the sidelink-assisted UE 104a or the relay UE 104b may operate one or any combination of antennas 865, RF front end 888, transceiver 802, processor 812, memory 816, modem 840, or DRX component 121 to adjusting communication with the second UE based on the DRX information of the DRX mode associated with the second UE. For example, any of the above components may include adjusting communication with the second UE based on the DRX information of the DRX mode associated with the second UE.

In some implementations, adjusting the communication with the second UE may include determining whether a retransmission condition has been met, the retransmission condition triggering retransmission of at least a portion of a data packet to the second UE after an end of the DRX mode, retransmitting at least the portion of a data packet to the second UE based on determining that a retransmission condition has been met, and forgoing retransmission of at least the portion of the data packet to the second UE based on determining that the retransmission condition has not been met.

In some implementations, the retransmission condition may include at least one of a distance between the UE and the second UE is smaller than or equal to a distance threshold value, or a RSRP of the DRX notification is larger than or equal to an RSRP threshold.

In some implementations, at least one of the distance threshold value or the RSRP threshold may be derived based on a 5G QOS indicator.

In some implementations, the DRX information may include a UE identifier 526 of the second UE. In some aspects, the UE identifier may correspond to a layer one or two identifier (L1ID or L2ID).

In some implementations, the DRX notification 520 may be received from a UE in a unicast connection, and adjusting the communication with the second UE comprises: forgoing transmission to the second UE in response to receiving the DRX notification and during the DRX mode of the second UE.

In some implementations, the DRX notification 520 may be received from a UE not in a unicast connection, and although not shown, the method 700 may further include retransmitting the broadcast transmission including the DRX notification to one or more UEs.

In some implementations, the DRX information may include at least one of timing information for a start time of a DRX period of the DRX mode and an end time of the DRX period of the DRX mode, or location information of the second UE.

In some implementations, receiving the DRX notification may include receiving a MAC CE including the DRX notification from the second UE.

In some implementations, the UE may be associated with a multicast group of UEs.

In some implementations, although not shown, the method 700 may include transmitting a second DRX notification including second DRX information to each of the UEs in the multicast group of UEs.

In some implementations, the UE and each of the UEs in the multicast group may share a common DRX period.

In some implementations, the UE may correspond to a transmitter UE and the second UE corresponds to a receiver UE in a D2D wireless communication system.

In some implementations, the DRX notification 520 may be received on a sidelink channel.

In some implementations, the sidelink may correspond to a PC5 interface.

Referring to FIG. 8, one example of an implementation of UE 104, including relay UE 104b and/or sidelink-assisted UE 104a, may include a variety of components, some of which have already been described above and are described further herein, including components such as one or more processors 812 and memory 816 and transceiver 802 in communication via one or more buses 844, which may operate in conjunction with modem 840 and/or configuration component 198 for communicating sidelink capability information.

In an aspect, the one or more processors 812 can include a modem 840 and/or can be part of the modem 840 that uses one or more modem processors. Thus, the various functions related to DRX component 121 may be included in modem 840 and/or processors 812 and, in an aspect, can be executed by a single processor, while in other aspects, different ones of the functions may be executed by a combination of two or more different processors. For example, in an aspect, the one or more processors 812 may include any one or any combination of a modem processor, or a baseband processor, or a digital signal processor, or a transmit processor, or a receiver processor, or a transceiver processor associated with transceiver 802. In other aspects, some of the features of the one or more processors 812 and/or modem 840 associated with configuration component 198 may be performed by transceiver 802.

Also, memory 816 may be configured to store data used herein and/or local versions of applications 875 or communicating component 842 and/or one or more of its subcomponents being executed by at least one processor 812. Memory 816 can include any type of computer-readable medium usable by a computer or at least one processor 812, such as random access memory (RAM), read only memory (ROM), tapes, magnetic discs, optical discs, volatile memory, non-volatile memory, and any combination thereof. In an aspect, for example, memory 816 may be a non-transitory computer-readable storage medium that stores one or more computer-executable codes defining relay communication component 121 and/or one or more of its subcomponents, and/or data associated therewith, when UE 104 is operating at least one processor 812 to execute relay communication component 121 and/or one or more of its subcomponents.

Transceiver 802 may include at least one receiver 806 and at least one transmitter 808. Receiver 806 may include hardware and/or software executable by a processor for receiving data, the code comprising instructions and being stored in a memory (e.g., computer-readable medium). Receiver 806 may be, for example, a radio frequency (RF) receiver. In an aspect, receiver 806 may receive signals transmitted by at least one base station 102. Additionally, receiver 806 may process such received signals, and also may obtain measurements of the signals, such as, but not limited to, Ec/Io, signal-to-noise ratio (SNR), reference signal received power (RSRP), received signal strength indicator (RSSI), etc. Transmitter 808 may include hardware and/or software executable by a processor for transmitting data, the code comprising instructions and being stored in a memory (e.g., computer-readable medium). A suitable example of transmitter 808 may including, but is not limited to, an RF transmitter.

Moreover, in an aspect, UE 104 may include RF front end 888, which may operate in communication with one or more antennas 865 and transceiver 802 for receiving and transmitting radio transmissions, for example, wireless communications transmitted by at least one base station 102 or wireless transmissions transmitted by UE 104. The one or more antennas 865 may include one or more antenna panels and/or sub-arrays, such as may be used for beamforming. RF front end 888 may be connected to one or more antennas 865 and can include one or more low-noise amplifiers (LNAs)

890, one or more switches 892, one or more power amplifiers (PAs) 898, and one or more filters 896 for transmitting and receiving RF signals.

In an aspect, LNA 890 can amplify a received signal at a desired output level. In an aspect, each LNA 890 may have a specified minimum and maximum gain values. In an aspect, RF front end 888 may use one or more switches 892 to select a particular LNA 890 and its specified gain value based on a desired gain value for a particular application.

Further, for example, one or more PA(s) 898 may be used by RF front end 888 to amplify a signal for an RF output at a desired output power level. In an aspect, each PA 898 may have specified minimum and maximum gain values. In an aspect, RF front end 888 may use one or more switches 892 to select a particular PA 898 and its specified gain value based on a desired gain value for a particular application.

Also, for example, one or more filters 896 can be used by RF front end 888 to filter a received signal to obtain an input RF signal. Similarly, in an aspect, for example, a respective filter 896 can be used to filter an output from a respective PA 898 to produce an output signal for transmission. In an aspect, each filter 896 can be connected to a specific LNA 890 and/or PA 898. In an aspect, RF front end 888 can use one or more switches 892 to select a transmit or receive path using a specified filter 896, LNA 890, and/or PA 898, based on a configuration as specified by transceiver 802 and/or processor 812.

As such, transceiver 802 may be configured to transmit and receive wireless signals through one or more antennas 865 via RF front end 888. In an aspect, transceiver may be tuned to operate at specified frequencies such that UE 104 can communicate with, for example, one or more base stations 102 or one or more cells associated with one or more base stations 102. In an aspect, for example, modem 840 can configure transceiver 802 to operate at a specified frequency and power level based on the UE configuration of the UE 104 and the communication protocol used by modem 840.

In an aspect, modem 840 can be a multiband-multimode modem, which can process digital data and communicate with transceiver 802 such that the digital data is sent and received using transceiver 802. In an aspect, modem 840 can be multiband and be configured to support multiple frequency bands for a specific communications protocol. In an aspect, modem 840 can be multimode and be configured to support multiple operating networks and communications protocols. In an aspect, modem 840 can control one or more components of UE 104 (e.g., RF front end 888, transceiver 802) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 812 may correspond to one or more of the processors described in connection with the UE in FIG. 4. Similarly, the memory 816 may correspond to the memory described in connection with the UE in FIG. 4.

Some Further Examples

In one example, a method of wireless communications by a UE comprises determining DRX information associated with a DRX mode including at least one of timing or location information, and transmitting a DRX notification including the DRX information to a second UE.

One or more of the above examples can further include wherein the DRX information further includes a UE identifier.

One or more of the above examples can further include wherein the DRX notification is transmitted using at least one of a unicast transmission or a broadcast transmission.

One or more of the above examples can further include entering the DRX mode after transmitting the DRX notification including the DRX information to the second UE.

One or more of the above examples can further include wherein the DRX information comprises the timing information, wherein the timing information includes a start time of a DRX period of the DRX mode and an end time of the DRX period of the DRX mode.

One or more of the above examples can further include wherein the location information includes a location of the UE.

One or more of the above examples can further include wherein transmitting the DRX notification includes transmitting a MAC CE including the DRX notification to the second UE.

One or more of the above examples can further include wherein the UE corresponds to a receiver UE and the second UE corresponds to a transmitter UE in a D2D wireless communication system.

One or more of the above examples can further include wherein the DRX notification triggers the second UE to forgo data transmissions to the UE while the DRX mode is active.

One or more of the above examples can further include wherein transmitting the DRX notification is transmitted on a sidelink channel.

One or more of the above examples can further include wherein the sidelink channel is based on a ProSe sidelink (PC5) interface.

In another example, a method of wireless communications by a UE, comprises receiving, from a second UE, a DRX notification including DRX information of a DRX mode associated with the second UE, and adjusting communication with the second UE based on the DRX information of the DRX mode associated with the second UE.

One or more of the above examples can further include wherein adjusting the communication with the second UE comprises determining whether a retransmission condition has been met, the retransmission condition triggering retransmission of at least a portion of a data packet to the second UE after an end of the DRX mode, retransmitting at least the portion of a data packet to the second UE based on determining that a retransmission condition has been met, and forgoing retransmission of at least the portion of the data packet to the second UE based on determining that the retransmission condition has not been met.

One or more of the above examples can further include wherein the retransmission condition includes at least one of a distance between the UE and the second UE is smaller than or equal to a distance threshold value, or a RSRP of the DRX notification is larger than or equal to an RSRP threshold.

One or more of the above examples can further include wherein at least one of the distance threshold value or the RSRP threshold is derived based on a 5G quality-of-service (QOS) indicator.

One or more of the above examples can further include wherein the DRX information includes a UE identifier of the second UE.

One or more of the above examples can further include wherein the DRX notification is received from a UE in a unicast connection, and adjusting the communication with the second UE comprises: forgoing transmission to the second UE in response to receiving the DRX notification and during the DRX mode of the second UE.

One or more of the above examples can further include wherein the DRX notification is received from a UE not in a unicast connection, the method further comprising retransmitting the broadcast transmission including the DRX notification to one or more UEs.

One or more of the above examples can further include wherein the DRX information includes at least one of timing information for a start time of a DRX period of the DRX mode and an end time of the DRX period of the DRX mode, or location information of the second UE.

One or more of the above examples can further include wherein receiving the DRX notification includes receiving a MAC CE including the DRX notification from the second UE.

One or more of the above examples can further include wherein the UE is associated with a multicast group of UEs.

One or more of the above examples can further include transmitting a second DRX notification including second DRX information to each of the UEs in the multicast group of UEs.

One or more of the above examples can further include wherein the UE and each of the UEs in the multicast group share a common DRX period.

One or more of the above examples can further include wherein the UE corresponds to a transmitter UE and the second UE corresponds to a receiver UE in a D2D wireless communication system.

One or more of the above examples can further include wherein the DRX notification is received on a sidelink channel.

One or more of the above examples can further include wherein the sidelink corresponds to a ProSe sidelink (PC5) interface.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a receiver user equipment (UE), comprising:
   determining discontinuous reception (DRX) information associated with a DRX mode of the receiver UE including at least one of timing information or location information, wherein the timing information includes a start time of a DRX period of the DRX mode of the receiver UE and an end time of the DRX period of the DRX mode of the receiver UE, wherein the location information includes a location of the receiver UE;
   transmitting, to a transmitter UE, a DRX notification including the DRX information; and
   entering the DRX mode in accordance with the DRX information after transmitting the DRX notification, including the DRX information, to the transmitter UE, wherein, during the DRX mode, the receiver UE is unable to receive data from the transmitter UE.

2. The method of claim 1, wherein the DRX information further includes a UE identifier associated with the receiver UE.

3. The method of claim 1, wherein the DRX notification is transmitted using at one of a unicast transmission or a broadcast transmission.

4. The method of claim 1, wherein transmitting the DRX notification includes transmitting a medium access control (MAC) control element (CE) including the DRX notification to the transmitter UE.

5. The method of claim 1, wherein the receiver UE corresponds to a sidelink-assisted UE and the transmitter UE corresponds to a relay UE in a device-to-device (D2D) wireless communication system.

6. The method of claim 1, wherein the DRX notification is transmitted on a sidelink channel.

7. The method of claim 1, wherein the timing information indicates the DRX period when the receiver UE enters a sleep mode.

8. A method of wireless communication at a transmitter user equipment (UE), comprising:
   receiving, from a receiver UE, a discontinuous reception (DRX) notification including DRX information of a DRX mode entered into by the receiver UE, wherein the receiver UE is unable to receive a data packet from the transmitter UE during the DRX mode, wherein the DRX information includes at least one of timing information or location information, wherein the timing information includes a start time of a DRX period of the DRX mode of the receiver UE and an end time of the DRX period of the DRX mode of the receiver UE, wherein the location information includes a location of the receiver UE;

determining whether a retransmission condition for transmitting at least a portion of the data packet to the receiver UE has been met based on the DRX information of the DRX mode associated with the receiver UE, wherein the retransmission condition comprises at least one of (1) a distance between the transmitter UE and the receiver UE is smaller than or equal to a distance threshold value, (2) a reference signal received power (RSRP) of the DRX notification is larger than or equal to an RSRP threshold, or (3) a time is outside the DRX period specified by the DRX information;

retransmitting, to the receiver UE, at least the portion of the data packet based on determining that the retransmission condition has been met; and foregoing retransmission of the at least the portion of the data packet to the receiver UE based on determining that the retransmission condition has not been met.

9. The method of claim 8, wherein at least one of the distance threshold value or the RSRP threshold is derived based on a 5G quality-of-service (QOS) (5QI) indicator.

10. The method of claim 8, wherein the DRX information includes a UE identifier of the receiver UE.

11. The method of claim 10, wherein the DRX notification is received from the receiver UE in a unicast connection, and wherein foregoing the retransmission of the at least the portion of the data packet to the receiver UE comprises:

forgoing the retransmission to the receiver UE in response to receiving the DRX notification and during the DRX mode of the receiver UE.

12. The method of claim 10, wherein the DRX notification is received from the receiver UE not in a unicast connection, the method further comprising:

retransmitting the DRX notification to one or more UEs.

13. The method of claim 8, wherein receiving the DRX notification includes receiving a medium access control (MAC) control element (CE) including the DRX notification from the receiver UE.

14. The method of claim 8, wherein the transmitter UE is associated with a multicast group of UEs.

15. The method of claim 14, further comprising transmitting a receiver DRX notification including second DRX information to each UE in the multicast group of UEs.

16. The method of claim 14, wherein the transmitter UE and each UE in the multicast group of UEs share a common DRX period.

17. The method of claim 8, wherein the transmitter UE corresponds to a relay UE and the receiver UE corresponds to a sidelink-assisted UE in a device-to-device (D2D) wireless communication system.

18. The method of claim 8, wherein the timing information indicates the DRX period when the receiver UE enters a sleep mode.

19. An apparatus for wireless communication at a receiver user equipment (UE), comprising:

a memory configured to store instructions; and at least one processor communicatively coupled with the memory, wherein the at least one processor is configured to:

determine discontinuous reception (DRX) information associated with a DRX mode of the receiver UE including at least one of timing information or location information, wherein the timing information includes a start time of a DRX period of the DRX mode of the receiver UE and an end time of the DRX period of the DRX mode of the receiver UE, wherein the location information includes a location of the receiver UE;

transmit, to a transmitter UE, a DRX notification including the DRX information; and enter the DRX mode in accordance with the DRX information after transmitting the DRX notification, including the DRX information, to the transmitter UE, wherein, during the DRX mode, the receiver UE is unable to receive data from the transmitter UE.

20. The apparatus of claim 19, wherein the DRX information further includes a UE identifier associated with the receiver UE.

21. An apparatus for wireless communication at a transmitter user equipment (UE), comprising:

a memory configured to store instructions; and at least one processor communicatively coupled with the memory, wherein the at least one processor is configured to:

receive, from a receiver UE, a discontinuous reception (DRX) notification including DRX information of a DRX mode associated with the receiver UE, wherein the receiver UE is unable to receive a data packet from the transmitter UE during the DRX mode, wherein the DRX information includes at least one of timing information or location information, wherein the timing information includes a start time of a DRX period of the DRX mode of the receiver UE and an end time of the DRX period of the DRX mode of the receiver UE, wherein the location information includes a location of the receiver UE;

determine whether a retransmission condition for transmitting at least a portion of the data packet to the receiver UE has been met based on the DRX information of the DRX mode associated with the receiver UE, wherein the retransmission condition comprises at least one of (1) a distance between the transmitter UE and the receiver UE is smaller than or equal to a distance threshold value, (2) a reference signal received power (RSRP) of the DRX notification is larger than or equal to an RSRP threshold, or (3) a time is outside the DRX period specified by the DRX information;

retransmit at least the portion of the data packet to the receiver UE based on determining that the retransmission condition has been met; and forego retransmission of the at least the portion of the data packet to the receiver UE based on determining that the retransmission condition has not been met.

22. The apparatus of claim 21, wherein to receive the DRX notification, the at least one processor is further configured to receive the DRX notification from the receiver UE in a unicast connection, and wherein to forego the retransmission of the at least the portion of the data packet to the receiver UE, the at least one processor is further configured to:

forgo the retransmission to the receiver UE in response to receiving the DRX notification and during the DRX mode of the receiver UE.

\* \* \* \* \*